Patented Feb. 12, 1952

2,585,407

UNITED STATES PATENT OFFICE 2,585,407

SPRAY BOOTH WASH AND A PROCESS OF MAKING IT

George A. Rives, Dearborn, Mich., assignor to General Motors Corporation, Detroit, Mich., a corporation of Delaware No Drawing. Application April 6, 1948, Serial No. 19,443

3 Claims. (Cl. 106—213)

This invention has to do with agents for addition to the water employed in water wash paint spray booths.

A water wash or water curtain spray booth consists primarily of an exhaust hood, somewhat similar to hoods or booths used in chemical laboratories to remove fumes. A curtain of water flows over one wall of the booth. The water for the curtain is supplied from a tank beneath the floor of the booth by means of a circulating pump. The pump raises the water from the tank to the top of the wall where it is allowed to flow down the wall as a thin sheet and then into the water tank. The work to be sprayed with paint passes between the spray gun operator and the water curtain. The water is supposed to collect the overspray or paint particles which don't fall on the work being painted and carry them to the water tank underneath the booth. It is also the usual practice to withdraw the air from the booth or spray room through the water curtain, usually below the wall over which the water flows. This separates from the air the paint spray particles carried by the air currents. In most cases also there are a series of baffles, called accumulators or eliminators, between the water curtain and the exhaust fan over which the exhaust air travels.

At first, plain water was used in the system, but it was found that the paint had a tendency to penetrate the water curtain and stick to the wall. This cuts off part of the water curtain and allows fresh tacky paint to plug up the water spray nozzles, build up on the accumulators, and finally on the exhaust fan, throwing it out of track and balance with a consequent expensive overhaul. The tacky paint sank to the bottom of the tank and was drawn into the circulating pump, plugging both pump and lines. Cleaning and maintenance costs became a real problem, requiring a large and expensive clean-up crew. At very frequent intervals it was necessary to drain the tank and scrape the built-up paint deposits from the whole system.

The first compounds added to the water in an attempt to alleviate the foregoing described difficulties, were simply cleaners such as, for example, sodium rosinate, sodium silicate, sodium metasilicate, trisodium phosphate, sodium carbonate and sodium hydroxide. Such ingredients were to some extent advantageous with certain paints but not with others. Kerosene-oleic acid-triethanalamine emulsions have been employed as have various other materials. While previously employed materials have had advantages in some cases, the results have not been entirely satisfactory and the primary object of the present invention is to provide a greatly improved addition agent for the spray booth water.

In accordance with the invention there is provided a compound for addition to the spray booth water that has two characteristics. First the water treated with the compound "kills" the paint, that is, destroys its adhesive characteristics and second, it causes the "killed" paint to float on the surface of the water in the tank. By floating the paint the sludge can be easily removed from the water in the tank by simply skimming it from the surface; also since the paint floats on the top of the water in the tank it is not drawn into the water pump, lines, water nozzles, etc.

I have discovered that the reaction products of starch, formaldehyde, an alkali metal hydroxide and water is a very satisfactory addition agent for the spray booth water for the purpose of "killing" the paint and causing the paint particles to float on the top of water in the tank.

A preferred formula consists about as follows, all percentages being by weight:

12.0% sodium hydroxide
2.0% cornstarch
8.5% formaldehyde (38–40% water solution)
77.5% water.

The exact proportions of the several constituents making up the addition agent are not critical and considerable variation is permissible. For example, satisfactory addition agents have been made in which the alkali metal hydroxide ranged from 5% to 20%, the starch from 0.5% to 5%, the formaldehyde (38–40% solution) from 2.5% to 20% and the balance to make 100% water (all percentages by weight). Specific illustrative examples of other formulations in addition to the preferred example are the following in which percentages are given by weight:

| Percent NaOH | Percent Starch | Percent Formaldehyde (38–40%) | Percent Water |
|---|---|---|---|
| 15 | 2.5 | 11.0 | 71.5 |
| 15 | 1.25 | 11.0 | 72.75 |
| 15 | 0.5 | 11.0 | 73.5 |
| 15 | 5.0 | 11.0 | 69.0 |
| 20 | 2.5 | 11.0 | 66.5 |
| 5 | 2.5 | 11.0 | 81.5 |
| 15 | 2.5 | 5.5 | 87.0 |
| 15 | 2.5 | 22.0 | 60.5 |
| 15 | 2.5 | 2.75 | 79.75 |

It is contemplated that potassium hydroxide may be used in place of sodium hydroxide in the foregoing examples.

In making up the addition agent the starch is put in suspension in water, formaldehyde added, and the mixture boiled with agitation until a colloidal-like solution results. The alkali metal hydroxide is dissolved separately in water, cooled and carefully added to the starch-formaldehyde solution, again with agitation. The mixture is exothermal. As the reaction takes place, the color turns brown and exhibits a marked tendency to froth if the temperature isn't carefully controlled. After the initial reaction takes place the mixture is gently boiled for three to five minutes.

The following is a specific and typical example of procedure that has been employed in forming one batch of the addition agent.

To twenty gallons of water, add five and one-quarter pounds of cornstarch and two and one-half gallons of 38–40% formaldehyde, heat slowly with agitation to 212° F. Allow to cool to 170° F. In a separate container dissolve thirty-one and one-quarter pounds of sodium hydroxide in five gallons of water. Cool the sodium hydroxide solution to 170° F. and add slowly and cautiously to the starch-fomaldehyde solution while thoroughly agitating the mixture. This will cause a rise in temperature and a color change to brown. When the temperature reaches 190° F. the addition of sodium hydroxide solution is stopped and the mixture cooled to 170° F. The remainder of the sodium hydroxide solution is then added, and the batch heated at 212° F. for three to five minutes. The resulting addition agent is a rather viscous liquid of a straw to amber color.

The addition agent is added to the spray booth water in relatively small amount. Experience has shown that with paints which are difficult to "kill" an amount added to the spray booth water sufficient to provide a two percent by volume solution provides very satisfactory results. As an illustrative example, when the spray booth water had added thereto sufficient of the addition agent to provide a two percent by volume solution very satisfactory "kill" and float characteristics were obtained when the paint being sprayed was Du Pont 475–1520 black primer. This paint is a linseed oil base, oleoresinous paint, and which, experience had shown, is an extremely difficult material to "kill." None of the previously known commercial addition agents had proved to be satisfactory. A two percent by volume solution has been employed satisfactorily on oleo-resinous type primers and surfacers.

Where the paint is not as difficult to "kill" a lower concentration of the addition agent can be employed. As an illustration a 1% by volume solution of the addition agent with the spray booth water produces very satisfactory "kill" and float characteristics where the paint being sprayed is Dulux (an alkyd base type paint) or chassis black (an asphalt base paint). For Duco a one-half percent by volume addition produces very satisfactory results. In some instances even lesser concentrations of the addition agent may be employed.

In another application of the invention, the addition agent together with bentonite was employed where the paint was a high bake enamel consisting of an alkyd urea-formaldehyde melamine formulation. No previously employed commercial compound was found to be satisfactory with this type finish. In this application of the invention a two per cent by volume of the addition agent plus one and one-half ounces of bentonite (a hydrous magnesium aluminum silicate) per gallon of spray booth water produced very satisfactory results.

While I have described what I consider to be preferred embodiments of the invention, it will be understood that various changes and modifications may be made by those skilled in the art without departing from the spirit and principles of the invention.

I claim:

1. The process of compounding an addition agent for the water employed in water wash paint spray booths consisting of adding starch to water, adding formaldehyde thereto, heating the mixture to the boiling point while agitating the same until a colloidal-like solution results, then slowly adding an aqueous solution of an alkali metal hydroxide to said colloidal-like solution while agitating the same, thereafter, after initial reaction of the composite mixture takes place, adding more of the aqueous solution of the hydroxide and thereafter gently boiling the material for about three to five minutes.

2. The process of compounding an addition agent for the water employed in water wash paint spray booths which consists of adding starch and formaldehyde to water, heating the water, starch, formaldehyde mixture until a colloidal-like solution results, and adding an aqueous solution of an alkali metal hydroxide to said colloidal-like solution, the percentages by weights of the several constituents being substantially as follows: starch 0.5% to 5%, formaldehyde (38–40% solution), 2.5% to 20%, alkali metal hydroxide 5% to 20% and the balance to make 100%, water.

3. The reaction product resulting from dissolving starch and formaldehyde in water, heating the water, starch, formaldehyde mixture, and thereafter adding an alkali metal hydroxide to said mixture, the proportions by weight of the several constitutents being substantially as follows: starch 0.5% to 5%, formaldehyde (38–40% solution), 2.5% to 20%, alkali metal hydroxide 5% to 20% and the balance to make 100%, water.

GEORGE A. RIVES.

REFERENCES CITED

The following references are of record in the file of this patent:

UNITED STATES PATENTS

| Number | Name | Date |
|---|---|---|
| 602,697 | Classen | Apr. 19, 1898 |
| 2,113,034 | Rowland et al. | Apr. 5, 1938 |
| 2,161,122 | Anderson | June 6, 1939 |
| 2,295,760 | Schreiber | Sept. 15, 1942 |
| 2,362,964 | Affleck | Nov. 21, 1944 |

FOREIGN PATENTS

| Number | Country | Date |
|---|---|---|
| 179,590 | Germany | Dec. 11, 1906 |
| 320,228 | Germany | Apr. 10, 1920 |